US006818028B2

(12) United States Patent
Barnett et al.

(10) Patent No.: US 6,818,028 B2
(45) Date of Patent: Nov. 16, 2004

(54) STEAM-METHANE REFORMER FURNACE WITH CONVECTION-HEATED PRE-REFORMER

(75) Inventors: Daniel Barnett, Houston, TX (US); Gregory B. Cargle, Houston, TX (US)

(73) Assignee: Kellogg Brown & Root, Inc., Houston, TX (US)

( * ) Notice: Subject to any disclaimer, the term of this patent is extended or adjusted under 35 U.S.C. 154(b) by 551 days.

(21) Appl. No.: 09/908,040

(22) Filed: Jul. 18, 2001

(65) Prior Publication Data

US 2003/0027096 A1 Feb. 6, 2003

(51) Int. Cl.[7] .............................. C01B 3/26; C01B 3/34
(52) U.S. Cl. ..................... 48/198.7; 48/127.7
(58) Field of Search .................. 48/198.7, 211, 48/212, 214 R, 215, 214 A, 127.7; 422/189, 191–193, 196–198, 200, 202–204, 211; 432/180–182; 423/651, 652; 429/20

(56) References Cited

U.S. PATENT DOCUMENTS

| 3,094,391 A | | 6/1963 | Mader | |
|---|---|---|---|---|
| 4,098,588 A | * | 7/1978 | Buswell et al. | 48/94 |
| 4,824,658 A | * | 4/1989 | Karafian et al. | 423/652 |
| 4,959,079 A | | 9/1990 | Grotz et al. | |
| 6,395,251 B1 | * | 5/2002 | Cotting | 423/652 |

* cited by examiner

Primary Examiner—Samuel M. Heinrich
(74) Attorney, Agent, or Firm—Kellogg Brown & Root, Inc.

(57) ABSTRACT

A steam/hydrocarbon reformer employing a convection-heated pre-reformer is disclosed. The pre-reformer comprises catalyst-filled tubes disposed in the transition section between the radiant and convection sections. The pre-reformer tubes are transverse to the flow of flue gas from the radiant section. The pre-reformer achieves 10–20% of the total reforming load, and can be installed as a module or modules between the radiant and convection sections without increasing the size of the reformer.

8 Claims, 4 Drawing Sheets

STEAM-METHANE REFORMER FURNACE WITH CONVECTION-HEATED PRE-REFORMER

FIELD OF THE INVENTION

This invention relates to steam-methane reformer furnaces, and more particularly to the application of a convection-heated transition duct pre-reformer in the design of a steam-methane reformer furnace.

BACKGROUND OF THE INVENTION

Hydrocarbon reforming furnaces are widely used to make synthesis gas containing hydrogen for hydrogen plants, methanol plants, ammonia plants and the like. The capacity of these plants is often limited by the amount of hydrogen that can be supplied to them, which in turn is limited by the capacity of the reformer furnace(s). The capacity of the reforming furnace can be limited by several factors, including the firing rate, the heat transfer rate in the radiant section, the heat transfer surface area (i.e., the number of catalyst-filled tubes) available in the radiant section, and the size of the radiant section of the reforming furnace. It would be very desirable to be able to increase the capacity of the reforming furnace without increasing the size or heat transfer area of the radiant section of the furnace.

The life of the radiant section and its components generally depends on the temperatures and firing rates in the radiant section. The higher the operating temperature of the radiant section is, generally the shorter the useful life. The more frequently the radiant section must be taken off line for maintenance, the less profitable the unit becomes. It would be very desirable to reduce the firing rate of the radiant section and lengthen its useful life and the time between maintenance shutdowns, without diminishing hydrogen capacity of the furnace while it is in operation.

The overall efficiency and/or total fuel firing requirement of a reformer furnace is largely determined by the required absorbed duty of the catalyst-filled radiant tubes. It would be very desirable to reduce the duty requirement of the radiant tubes so that the radiant section firing rate can be reduced and/or recovery of waste heat can be accomplished more economically.

The tubes in the radiant section of a conventional reforming furnace are generally filled with a catalyst such as nickel on an alumina support. Great care must ordinarily be taken to minimize the formation of coke on the catalyst, as well as the introduction of catalyst-poisoning contaminants in the feed stream supplied to the tubes. Coke formation generally occurs at the entry of the hot feedstock into the tubes, before sufficient hydrogen is present in the gas to inhibit coke formation, and for this reason, each tube is filled with smaller-sized catalyst particles on top of a larger catalyst shape that fills the remainder of each tube. The smaller catalyst particles provide a relatively high ratio of surface area to volume, and a lower void fraction, which minimize the film temperature to inhibit coke formation that can otherwise reduce catalyst activity and foul the tubes. However, the smaller catalyst particle zone in each tube greatly complicates the catalyst loading into the tubes, and significantly increases the pressure drop through the tubes. The catalyst at the tube inlet is also more susceptible to deactivate in the event catalyst poisons are fed into the tubes.

One traditional method for increasing the hydrogen production rate has focused on the employment of a high-nickel, high activity catalyst to improve conversion in an adiabatic (unheated) pre-reformer. However, the high activity catalyst is expensive to use, and can be overly sensitive to coke formation and catalyst poisoning.

U.S. Pat. No 3,094,391 to Mader discloses convection-heated hydrocarbon reforming in parallel with radiant-heated reforming. The influents to the two different reforming reaction tubes are split apart from a common feedstock supply, and the effluents from the convection- and radiant-heated tubes are mixed together. The flue gas from the radiant section is passed longitudinally along, as opposed to transversely across, the tubes in the convection-heated section, which can be finned to improve heat transfer. This configuration is said to improve the efficiency of the furnace, but is vulnerable to the detrimental effects of differences between the heat transfer distribution among the catalyst tubes in the convection-heated reaction zone. Moreover, the Mader design can also result in different conversion rates between the convection-heated and radiant-heated reaction zones, and provides no means for compensating for any possible differences in heat transfer and conversion rates.

U.S. Pat. No 4,959,079 to Grotz et al. discloses convection-heated reforming in the upper or entry portion of radiant-heated catalyst tubes by directing the flue gases through a convection-heated channel through which the catalyst tubes extend. This upper portion of each catalyst tube is designed with an extended surface such as studs or longitudinal fins to improve heat transfer. Again, this design can result in different heat transfer and conversion rates, and provides no means for compensating for these differences. Furthermore, this design does not change the number of the radiant-heated tubes, and therefore has limited advantage.

SUMMARY OF THE INVENTION

The present invention uses a convection-heated reaction zone in series with the radiant-heated reaction zone so that the convection-heated reaction zone functions as an upstream pre-reformer. To avoid the effects in differences in heat transfer and conversion rates between tubes in the convection-heated pre-reformer, partially reformed effluent from the convection-heated reaction zone is preferably collected and distributed to the radiant-heated catalyst tubes. The convection-heated pre-reformer tubes absorb up to 15 or 20 percent of the required reforming load of the reformer furnace, reducing the reformer furnace firing or tube count by a corresponding proportion. The upstream pre-reformer can reduce the overall size of the reformer. This is because, for a given capacity, the radiant section can be 15–20 percent smaller and the convection-heated pre-reformer tubes can be located in the transition duct without altering the footprint or connecting flanges of the transition duct. The pre-reformer can use relatively large diameter tubes to add relatively little pressure drop. Conventional nickel catalyst can be used; high activity catalyst is not required in the radiant section or in the pre-reformer. The pre-reformer can act as a guard for the radiant-section catalyst, assuring a relatively high hydrogen content to avoid coke formation or catalyst poisoning in the radiant section. A uniform relatively large catalyst size can be used in the radiant section to simplify catalyst loading and minimize the overall pressure drop. The benefits of the pre-reformer can be applied to reduce the cost of either or both the convection section and the combustion air pre-heater.

In one aspect, the present invention provides a reformer, comprising: a fired radiant section, a transition section and a convection section. The radiant section produces a hot flue gas. The transition section receives the hot flue gas from the radiant section and partially cools a flow of the flue gas through the transition section. The convection section further cools the partially cooled flue gas from the transition section. A feed preheat exchanger is disposed in the convection section for preheating a hydrocarbon feed stream. A convection-heated pre-reformer is located in the transition section for partially reforming the preheated hydrocarbon feed stream from the preheat exchanger to form a hydrogen-containing, partially reformed feed stream. The pre-reformer comprises a plurality of catalyst-filled tubes disposed transversely to the flow of the flue gas through the transition section. A manifold is provided for distributing the partially reformed feed stream into a plurality of catalyst-filled tubes disposed in the radiant section for reforming the feed stream to form a hydrogen-rich synthesis gas. A manifold is provided for recovering the hydrogen-rich synthesis gas from the catalyst-filled tubes in the radiant section.

In another aspect, the present invention provides a steam reforming process for producing synthesis gas from a furnace comprising radiant, transition and convection sections. The process comprises the steps of: (a) firing the radiant section to produce a hot flue gas; (b) passing the hot flue gas serially from the radiant section through the transition and convection sections to recover heat from the flue gas; (c) passing a hydrocarbon feed stream through a preheat exchanger in the convection section to preheat the hydrocarbon feed stream in indirect heat exchange with the flue gas; (d) passing the preheated hydrocarbon feed stream from the preheat exchanger into a convection-heated pre-reformer comprising a plurality of catalyst-filled tubes disposed in the transition section transverse to a flow of the flue gas therethrough to form a hydrogen-containing, partially reformed feed stream; (e) distributing the partially reformed feed stream into a plurality of catalyst-filled tubes disposed in the radiant section for reforming the feed stream to form a hydrogen-rich synthesis gas; and (f) recovering the hydrogen-rich synthesis gas from the catalyst-filled tubes in the radiant section.

In a further aspect, the present invention provides a method for retrofitting a steam reformer that comprises (1) a fired radiant section for heating catalyst-filled reforming tubes and producing a hot flue gas, (2) a convection section for recovering heat from the flue gas, (3) an adiabatic transition section for passing the flue gas from the radiant section to the convection section, (4) a feed preheat coil in the convection section for preheating a hydrocarbon feed stream, and (5) a manifold for distributing the preheated hydrocarbon feed stream from the feed preheat coil into the reforming tubes. The method comprises the steps of: (a) installing a convection-heated pre-reformer in the transition section comprising a plurality of catalyst-filled tubes transverse to a flow of the flue gas therethrough for forming a hydrogen-containing, partially reformed feed stream; (b) installing a first line or lines for passing the preheated hydrocarbon feed stream from the feed preheat coil into the pre-reformer; and (c) installing a second line or lines for passing the partially reformed feed stream from the pre-reformer to the distribution manifold.

In the present invention, the duty of the pre-reformer is preferably from about 5 to about 20 percent of the duty of the radiant section. The transition section and pre-reformer are preferably a modular unit. The pre-reformer tubes preferably have an inside diameter of at least about 125 mm. A pressure drop through the pre-reformer tubes is preferably less than about 0.1 MPa. The catalyst in the catalyst-filled tubes, at least in the radiant section, preferably has a substantially uniform size distribution. The catalyst in the catalyst-filled tubes in the pre-reformer preferably has a nickel content from about 15 to about 19 weight percent and is optionally promoted with potassium.

The process or method described above can further include the steps of preheating combustion air for the firing of the radiant section by passing at least a portion thereof through an air preheat coil in the convection section; and in response to any variations in catalyst activity in the pre-reformer, adjusting the air preheat temperature, the radiant section firing rate or a combination thereof, for process control. The process can also include using the pre-reformer as a guard for the catalyst in the radiant section, whereby the partially reformed hydrocarbon feed stream contains a sufficient amount of hydrogen so as to substantially avoid coke formation in the radiant section tubes.

DESCRIPTION OF THE INVENTION

Figure 1:
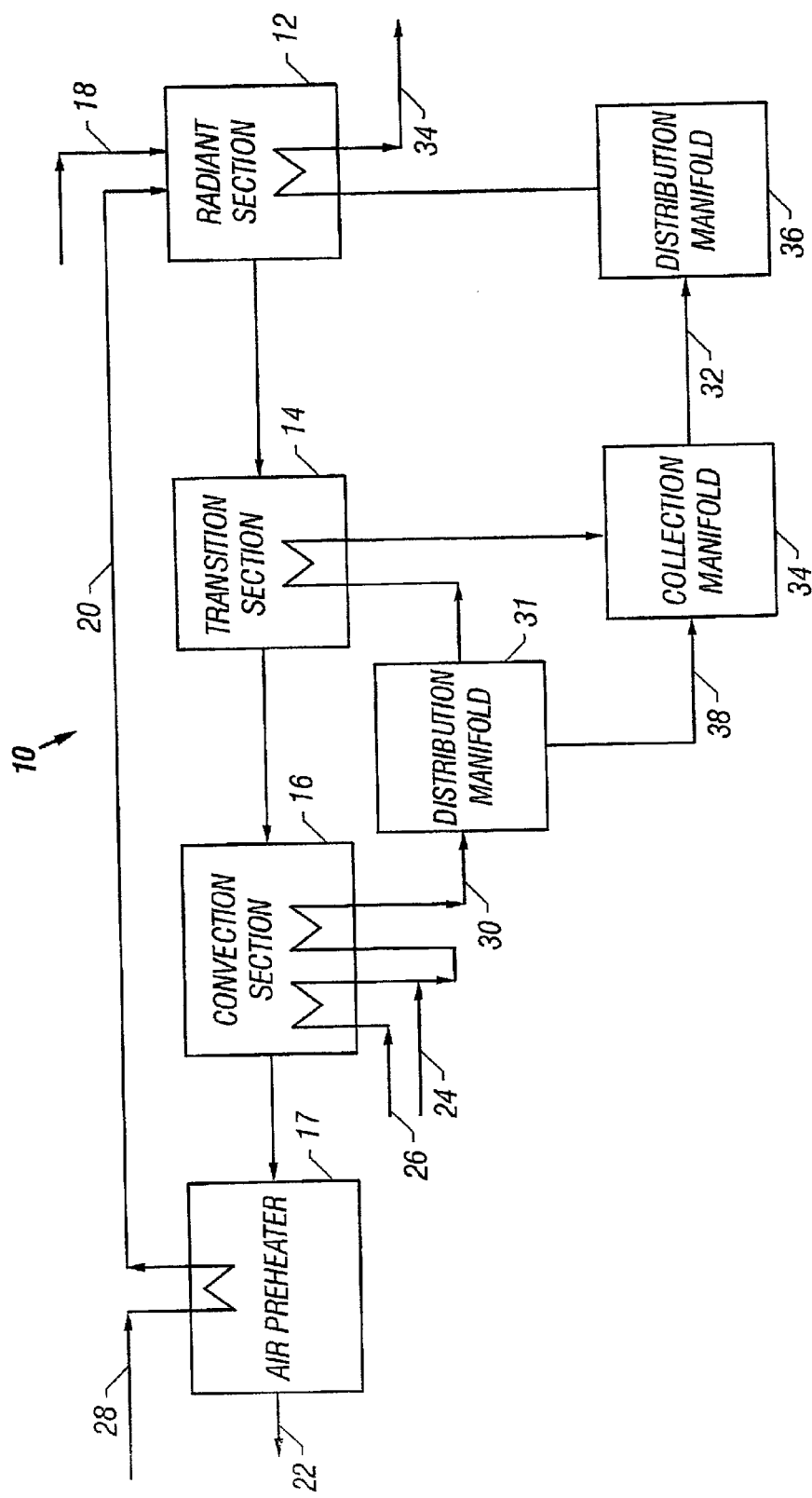
FIG. 1 is a schematic block flow diagram of the reforming furnace according to one embodiment of the present invention showing the process flow relationship between the radiant, transition and convection sections.

With reference to FIG. 1, there is shown a process flow schematic of a reformer 10 according to one embodiment of the invention, which has radiant section 12, transition section 14 and convection section 16. The radiant section 12 is fired by conventional fuel supplied via line 18 and combustion air via lines 20 and 28, which can, if desired, be preheated by indirect heat exchange with the flue gas in combustion air preheater 17, as is well known to those skilled in the art. Flue gas passes serially from the radiant section 12, and is cooled as it passes through the transition section 14, the convection section 16 and the combustion air preheater 17. Cooled flue gas is discharged from the combustion air preheater 17 via line 22.

The convection section 16 is used to recover heat from the flue gas by convective heat transfer with the hydrocarbon feed stream 26, by further heating the resulting mixture of hydrocarbon and steam introduced via line 24, and by otherwise using the hot flue gas for heating other services (not shown) in the convection section 16, as is well known in the art. In general, the process steam stream 24 is mixed with the hydrocarbon feed stream 26 at the desired ratio of steam to hydrocarbon, and the mixture is heated in the convection section 16, as is conventional in the art.

According to the present invention, the mixture of steam and hydrocarbon in line 30 is passed via a distribution manifold 31 through catalyst-filled tubes in the transition section 14 to partially reform the hydrocarbon and steam mixture and partially convert it to hydrogen and carbon oxides. The partially reformed gas mixture is recovered in collection manifold 34, and then supplied via line 32 to distribution manifold 36 that is conventional in the art for distributing feed to the catalyst-filled tubes (see FIG. 3) in the radiant section 12. If desired, all or a portion of the hydrocarbon/steam mixture can bypass the transition section 14 via crossover line 38. Reformed gas from the radiant section 12 is collected in a conventional manifold (not shown) and discharged via line 34 for further processing.

Figure 2:
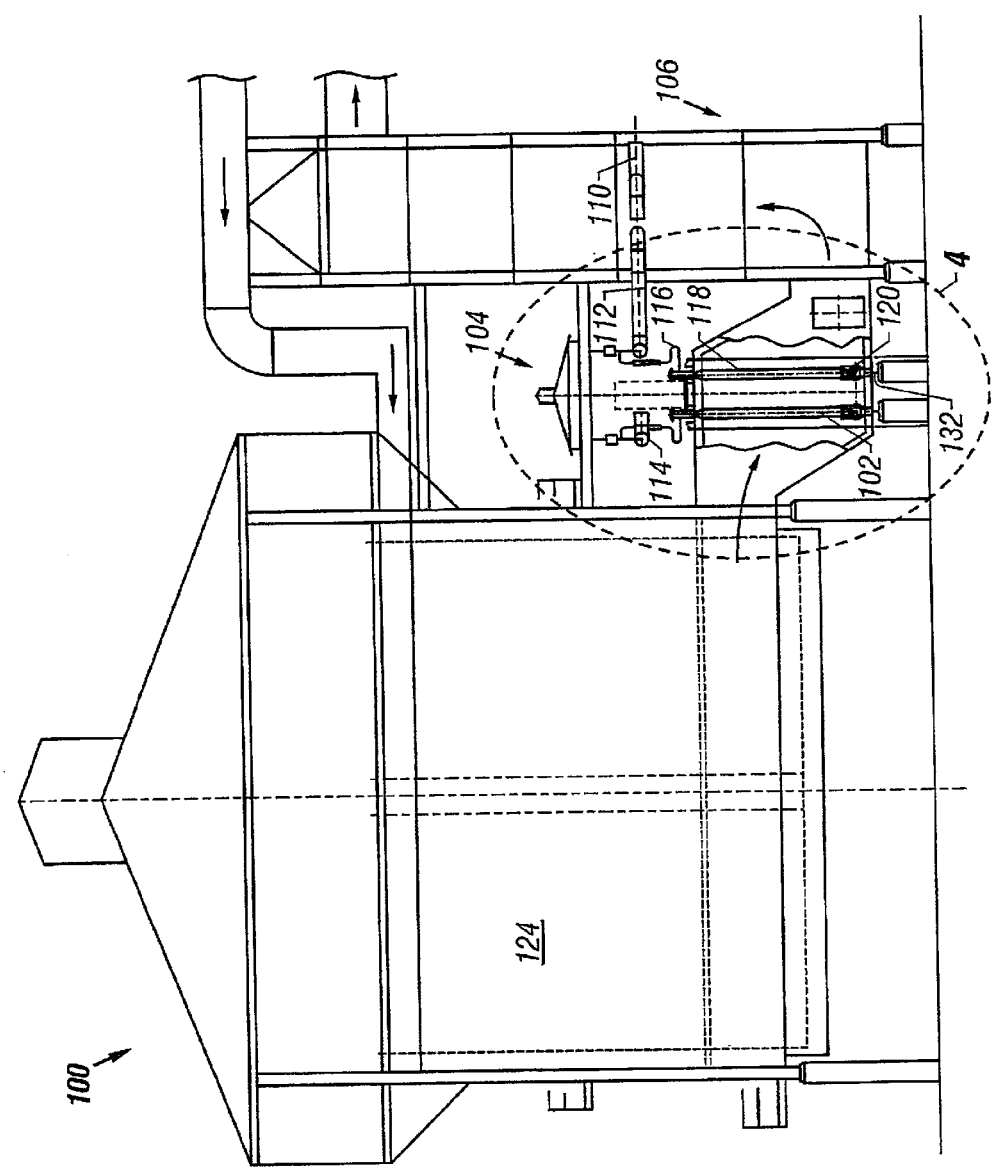
FIG. 2 is a side elevation of the reforming furnace according to one embodiment of the present invention.
Figure 3:
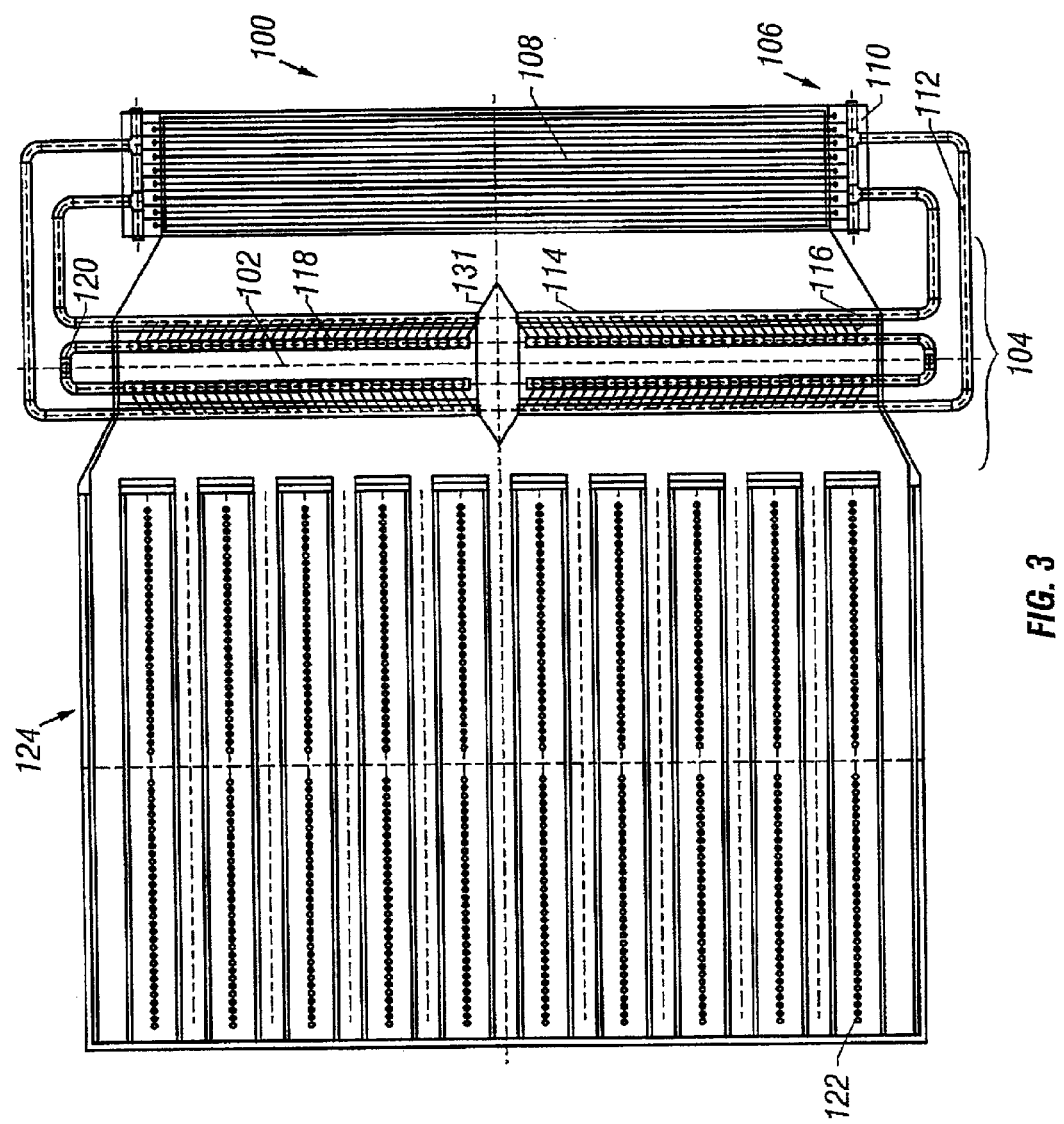
FIG. 3 is a plan view of the reforming furnace of FIG. 2.
Figure 4:
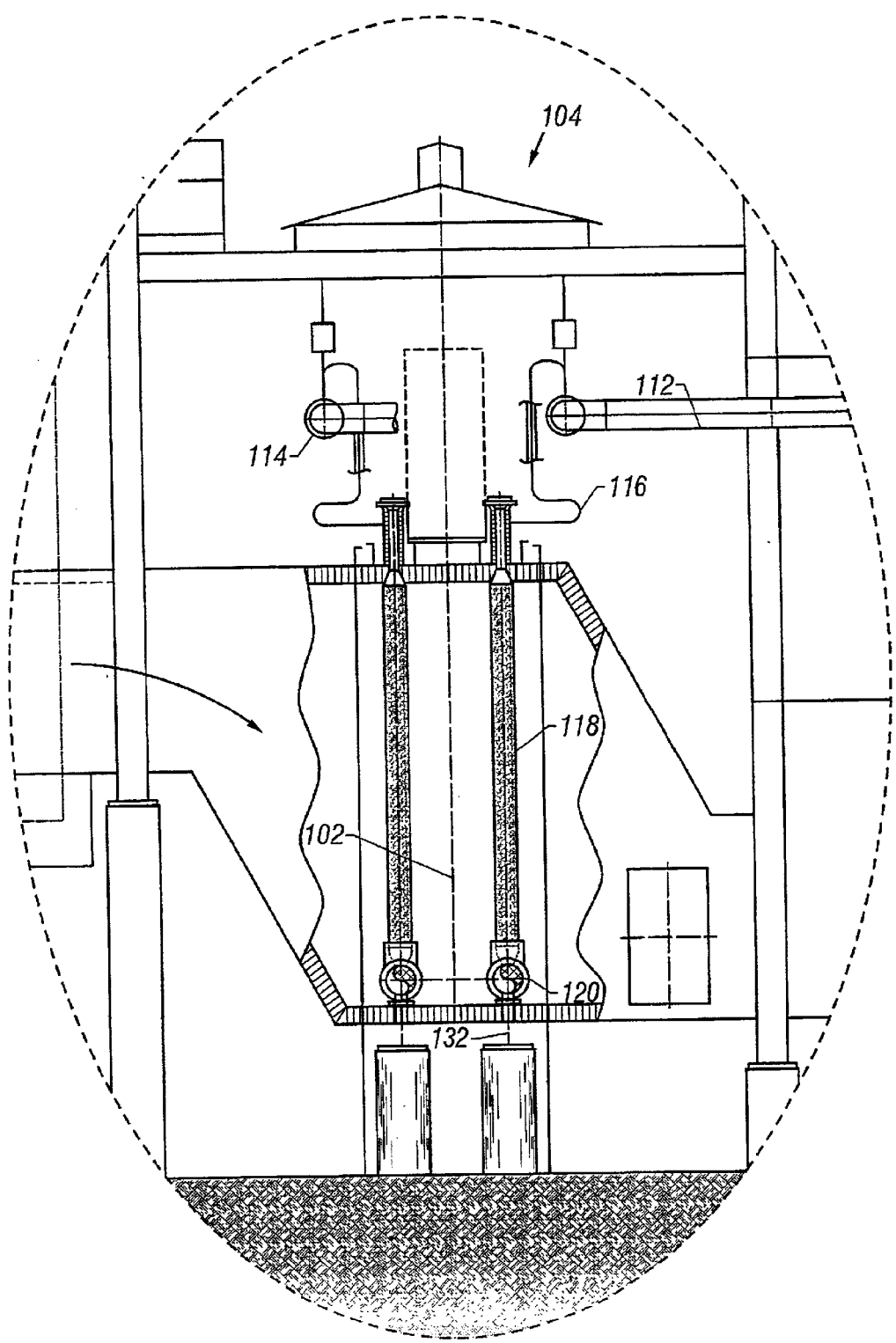
FIG. 4 is an enlarged elevation of the transition section in the reforming furnace of FIG. 2.

FIGS. 2, 3 and 4 show the elevation, plan and enlarged elevation, respectively, of a typical design of a reforming furnace 100 modified to include a convection-heated pre-reformer 102 in the transition section 104 according to one embodiment of the invention. The modified reforming furnace 100 represents either a new furnace built in accordance with the design principles of the present invention, or an existing furnace that has been modified to incorporate the present design principles.

The convection section 106 has a coil 108 (see FIG. 3) for preheating the hydrocarbon feed/steam mixture. The preheated mixture is collected in manifolds 110 and flows through crossovers 112 into transition section inlet manifolds 114. The mixture is then distributed via inlet pigtails 116 into vertical catalyst-filled tubes 1118 wherein it is partially reformed. The partially reformed gas is then gathered in outlet manifolds 120 and supplied to catalyst-filled tubes 122 (see FIG. 3) in the radiant section 124 in the usual manner.

The transition section 104 is preferably assembled and installed as a module or modules, which can be conveniently connected together and between the radiant section 124 and the convection section 106, for example, via mating flanges (not shown) which are bolted together. Where multiple modules are employed, they can be connected laterally at intermediate bridges 131 (see FIG. 3) as required. For example, two modules as illustrated will require one bridge 131, whereas four modules would require three bridges 131.

The tubes 118 can be vertical or horizontal as desired, but we prefer a vertical configuration as illustrated to facilitate catalyst loading into the tubes 118, and so that the outlet manifolds 120 can support the tubes 118 at lower ends thereof. The outlet manifolds 120 are in turn supported by structural members 132 on either side of the transition section 104. We prefer to orient the tubes 118 transversely with respect to the flow of the flue gas through the transition section 104 to provide a better outside heat transfer coefficient. The transition section 104 should also be constructed with a cross section for the flue gas to have a relatively high velocity. The transverse orientation of the tubes 118 and the relatively high flue gas velocity through the transition section 104 obtains suitable convective heat transfer for the partial reforming reaction in the tubes 118, and avoids the need for extended surfaces on the smooth-walled tubes 118, which could be problematic at the high temperature condition at which the transition section 104 is operated.

The radiant section 124 is practically unchanged from the designs typically employed by those skilled in the art, except that the number of tubes 122 which are used, and the firing rate in the radiant section 124, can be reduced to the extent that partial reforming is obtained in the transition section 104. Alternatively, the firing rate and number of tubes 122 can be maintained and a higher capacity achieved. We prefer to use the arch-mounted burners employed for down-fired radiant sections 124 typically seen in world-scale reformers.

The convection section 106 is likewise practically unchanged from the designs typically employed in the art, except that the heat recovered from the flue gas can be altered from that experienced without pre-reforming in the transition section 104. For example, since the relative amount of flue gas and the temperature thereof may be reduced by the present design owing to its improved efficiency, less steam might be recovered, or less combustion air preheat might be utilized. This has the potential advantages of reducing capital and operating costs owing to the relatively smaller size and lower cost of the convection section 106 or the components thereof.

The operation of the reformer 100 is similar to reformers not including the transition section 104 pre-reforming, with the most notable difference being that the control of the pre-reformer potentially adds another variable to the control system. However, the pre-reforming allows more flexibility in the operation of the reformer 100. In addition to the air preheat and the rate of firing controlled in the prior art reformer designs, the present design also allows the pre-reforming to be employed as another control mechanism, for example, by bypassing some or all of the preheated steam/hydrocarbon mixture from the crossovers 112 around the transition section 104 and directly into the manifold(s) 120 that supply the radiant section tubes 122.

The use of a pre-reforming step in accordance with the principles of the present invention provides a number of benefits not found in the prior art reforming designs. The present design has the potential for reducing the fuel firing rate by up to 10 to 15 percent or more for a given reforming load. This corresponds to the amount of reforming achieved by pre-reforming in the tubes 118. Because the firing rate is reduced, it is also possible to reduce the number of tubes 122 in the radiant section 124 by as much as 10 to 15 percent or more, relative to the prior art design at the same reforming duty. Reducing the number of tubes 122, in turn, reduces the size of the radiant section 124, including its footprint. Since the tubes 118 can be located in the transition section 104 without increasing its footprint, the overall size of the reformer 100 is reduced. In addition, the pre-reformer 102 can be designed, fabricated, transported and installed as one or more modules, with great facilitation of these tasks. In retrofit applications in particular, the modular replacement of the original transition section with the transition section 104 of the present invention can be achieved quickly and relatively easily during down time scheduled for maintenance of the radiant section 124 and/or the convection section 106. Servicing of the pre-reformer 102 is also facilitated by a modular construction since replacement modules can be moved into place and readied for installation at the site of the reformer 100 prior shutting it down for service.

The tubes 118 can be of a relatively large inside diameter, preferably at least 125 mm, more preferably at least 250 mm. This results in increasing the pressure drop only minimally by including the pre-reformer 102 and its associated piping and manifolds. For example, the pressure drop increases, relative to the reformer without the pre-reformer 102, to less than about 0.1 MPa, preferably 0.08 to 0.1 MPa. The tubes 118 can be filled with a conventional reforming catalyst having a nickel content from 15 to 19 weight percent, with or without potassium promotion. High activity, high nickel adiabatic pre-reforming catalysts, with their concomitant coking and activity degradation problems, are not required, and are preferably avoided. Furthermore, the pre-reformer 102 acts as a guard for the catalyst in the radiant tubes 122, assuring a relatively high hydrogen content in the gas fed thereto. This significantly reduces the concern about coking in the tubes 122. As a result, the tubes 122 can be filled with catalyst of a uniform, relatively large size since the prior art practice of using smaller-sized catalyst in the entry to the radiant tubes to avoid coking is no longer required. In turn, this reduces the pressure drop, and helps minimize any increased pressure drop added by the pre-reformer 102 relative to the reformer without the pre-reformer 102.

EXAMPLES

A design comparison was made to show the effects of a convection-heated pre-reformer in a typical 200 MMSCFD hydrogen plant reformer furnace design, with varying levels of combustion air preheat. The results of the design comparison are presented in the Table below.

TABLE

|  | BASE CASE | WITH CONVECTION-HEATED PRE-REFORMER | | | |
|---|---|---|---|---|---|
| Combustion Air Temperature, ° F. | 740 | 575 | 625 | 675 | 725 |
| Total Absorbed Duty, MMBtu/h | 1322 | 1294 | 1274 | 1247 | 1224 |
| Total Fired Duty, MMBtu/h | 1452 | 1421 | 1393 | 1370 | 1344 |
| PSA Fuel, MMBtu/h | 1050 | 1050 | 1050 | 1050 | 1050 |
| RFG Fuel, MMBtu/h | 402 | 371 | 343 | 320 | 294 |
| Overall Efficiency, % | 91.0 | 91.0 | 91.0 | 91.0 | 91.0 |
| Fuel Savings, MMBtu/h | Base | 30.8 | 59.0 | 82.4 | 107.6 |
| 5-Year Value (at $3.50/Mbtu and 97% onstream) | Base | $ 4,580,000 | $ 8,773,000 | $12,253,000 | $ 16,000,000 |
| Steam Export, lb/h | 353,720 | 340,850 | 319,300 | 301,000 | 281,000 |
| Incremental Steam Export, lb/h | Base | (12,870) | (34,420) | (52,720) | (72,720) |
| 5-Year Value (at $3.75/1000 lb and 97% onstream) | Base | ($2,050,000) | ($5,484,000) | ($ 8,400,000) | ($11,586,000) |
| Net Operating Cost Savings |  | $ 2,530,000 | $ 3,289,000 | $ 3,853,000 | $ 4,414,000 |
| Capital Cost Savings |  |  |  |  |  |
| Convection section |  | $ 265,000 | $ 271,000 | $ 275,000 | $ 279,000 |
| Air preheater |  | $ 1,044,000 | $ 840,000 | $ 555,000 | $ 120,000 |
| Radiant/prereformer |  | $ 100,000 | $ 100,000 | $ 100,000 | $ 100,000 |
| Total capital cost savings |  | $ 1,409,000 | $ 1,211,000 | $ 930,000 | $ 499,000 |
| Evaluated Cost Difference |  | $ 3,939,000 | $ 4,500,000 | $ 4,783,000 | $ 4,913,000 |

This example shows that the reformer duty in the radiant section can be considerably reduced by using the transition-section pre-reformer according to the present invention. Relative to the base case, the radiant section in the pre-reformer equipped unit has 96 fewer tubes at 922 lb/tube for a savings of 88,512 lbs of 25-Cr/35-Ni HP MOD alloy. This is offset by 120 pre-reformer tubes at 600 lb/tube for a total of 72,000 lbs alloy for the transition section. Considering the cost of the additional manifolds, piping, controls, structural features and the like, the use of the pre-reformer saves $100,000 just in the cost of the radiant and transition sections. Relatively larger capital cost savings are achieved by reducing the size of the air preheater. Depending on the fuel costs for firing the radiant section and the high pressure steam market or export values, it can be desirable to minimize the air preheater costs or maximize fuel savings. For example, if fuel costs are high and/or the value for steam export is low, it may be advantageous to increase the size of the air preheat. On the other hand, if fuel is not expensive and/or there is a strong market for steam export, it may be advantageous to have less air preheat.

The invention has been described above with reference to preferred embodiments and specific examples for the purpose of illustration, and not by way of limitation. Many variations will become apparent to the skilled artisan in view of the above disclosure. It is intended that all such variations within the scope or spirit of the appended claims shall be embraced thereby.

We claim:

1. A steam reforming process for producing synthesis gas from a furnace comprising radiant, transition and convection sections, comprising the steps of:
   (a) firing the radiant section to produce a hot flue gas;
   (b) passing the hot flue gas serially from the radiant section through the transition and convection sections to recover heat from the flue gas;
   (c) passing a hydrocarbon feed stream through a preheat exchanger in the convection section to preheat the hydrocarbon feed stream in indirect heat exchange with the flue gas;
   (d) passing the preheated hydrocarbon feed stream from the preheat exchanger in a convection-heated pre-reformer comprising a plurality of catalyst-filled tubes disposed in the transition section transverse to a flow of the flue gas therethrough to form a hydrogen-containing, partially reformed feed stream;
   (e) distributing the partially reformed feed stream into a plurality of catalyst-filled tubes disposed in the radiant section for reforming the feed stream to form a hydrogen-rich synthesis gas;
   (f) recovering the hydrogen-rich synthesis gas from the catalyst-filled tubes in the radiant section.

2. The process of claim 1 wherein the duty of the pre-reformer is from about 5 to about 20 percent of the duty of the radiant section.

3. The process of claim 1 wherein the pre-reformer tubes have an inside diameter of at least about 125 mm.

4. The process of claim 1 wherein a pressure drop through the pre-reformer tubes is less than about 0.1 Mpa.

5. The process of claim 1 wherein the catalyst in the catalyst-filled tubes has a uniform size distribution.

6. The process of claim 1 wherein the catalyst in the catalyst-filled tubes in the pre-reformer has a nickel content from about 15 to about 19 weight percent and is optionally promoted with potassium.

7. The process of claim 1, further comprising the steps of:
   (g) preheating combustion air for the firing of the radiant section by passing at least a portion thereof through an air preheat coil in the convection section; and (h) in response to any variations in catalyst activity in the pre-reformer, adjusting the air preheat temperature, the radiant section firing rate or a combination thereof, for process control.

8. The process of claim 7 comprising the further step of using the pre-reformer as a guard for the catalyst in the radiant section, whereby the partially reformed hydrocarbon feed stream contains a sufficient amount of hydrogen so as to substantially avoid coke formation in the radiant section tubes.

* * * * *